US010725870B1

(12) United States Patent
Gu et al.

(10) Patent No.: US 10,725,870 B1
(45) Date of Patent: *Jul. 28, 2020

(54) CONTENT-BASED AUTOMATIC BACKUP OF IMAGES

(71) Applicant: Symantec Corporation, Mountian View, CA (US)

(72) Inventors: Lei Gu, Bedford, MA (US); Ilya Sokolov, Boston, MA (US)

(73) Assignee: NortonLifeLock Inc., Tempe, AZ (US)

( * ) Notice: Subject to any disclaimer, the term of this patent is extended or adjusted under 35 U.S.C. 154(b) by 270 days.

This patent is subject to a terminal disclaimer.

(21) Appl. No.: 15/860,548

(22) Filed: Jan. 2, 2018

(51) Int. Cl.
*G06F 11/14* (2006.01)
*G06F 16/51* (2019.01)

(52) U.S. Cl.
CPC ...... *G06F 11/1461* (2013.01); *G06F 11/1464* (2013.01); *G06F 16/51* (2019.01); *G06F 2201/80* (2013.01)

(58) Field of Classification Search
USPC .................................................. 707/654, 709
See application file for complete search history.

(56) References Cited

U.S. PATENT DOCUMENTS

| 7,979,418 B1* | 7/2011 | Schlemmer | G06F 16/322 707/709 |
| 8,527,618 B1* | 9/2013 | Wiese | G06F 21/575 709/223 |
| 10,438,000 B1* | 10/2019 | Gu | G06F 21/568 |
| 2002/0112116 A1* | 8/2002 | Nelson | G06F 16/284 711/103 |
| 2007/0067304 A1 | 3/2007 | Ives | |
| 2009/0192979 A1 | 7/2009 | Lunde | |
| 2010/0049565 A1 | 2/2010 | Aebig et al. | |
| 2010/0092084 A1 | 4/2010 | Peronnin et al. | |
| 2010/0189354 A1 | 7/2010 | de Campos et al. | |
| 2011/0060895 A1 | 3/2011 | Solomon | |

(Continued)

OTHER PUBLICATIONS

Diep, France, "An Algorithm that Recognizes Faces Better than People Can," Popular Science, Apr. 23, 2014, 2 pages. Retrieved from the Internet: <http://www.popsci.com/article/technology/algorithm-recognizes-faces-better-people-can>.

(Continued)

*Primary Examiner* — Hung T Vy
(74) *Attorney, Agent, or Firm* — Patent Law Works LLP

(57) ABSTRACT

The content of each specific image file on an endpoint is analyzed. Each analyzed image file is categorized based on the results of analyzing its content. The analysis can be in the form identifying one or more objects graphically represented in given image files, and the categorization of image files can be based on these identified graphically represented object(s). A backup policy is configured to automatically backup specific image files on the endpoint, based on their content as per the categorization. Information concerning the content-based categorization of the image files on the endpoint can be output to a user. In response, directives for backing-up image files according to their content-based categorization can be received from the user. Specific images files are backed-up automatically, regardless of their location on the endpoint, according to the configured backup policy.

20 Claims, 5 Drawing Sheets

(56) References Cited

U.S. PATENT DOCUMENTS

| | | |
|---|---|---|
| 2011/0078497 A1 | 3/2011 | Lyne et al. |
| 2011/0082838 A1 | 4/2011 | Niemela |
| 2011/0161364 A1 | 6/2011 | Hwang |
| 2013/0024467 A1 | 1/2013 | Miller |
| 2013/0159768 A1 | 6/2013 | McKay et al. |
| 2013/0318610 A1 | 11/2013 | Zaitsev |
| 2017/0075698 A1* | 3/2017 | Zamir ................ G06F 3/0689 |
| 2017/0091453 A1 | 3/2017 | Cochin |
| 2017/0140156 A1 | 5/2017 | Gu et al. |
| 2017/0331772 A1 | 11/2017 | Stillabower |
| 2018/0060591 A1 | 3/2018 | Dobrila et al. |

OTHER PUBLICATIONS

DeepDream, Wikipedia, Retrieved on Oct. 10, 2018, 4 pages. Retrieved from the Internet: <https://en.wikipedia.org/wiki/DeepDream>.

OpenCV Download, Retrieved on Oct. 10, 2018, 4 pages. Retrieved from the Internet: <https://sourceforge.net/projects/opencv-library/>.

"Google Search—Stay in the Known with Your Google App" Retrieved on Oct. 10, 2018, 5 pages. Retrieved from the Internet: <https://www.google.com/intl/es419/search/about/>.

Kishore, Aseem, "How to Hide files in JPEG Pictures", https://www.online-tech-tips.com/computer-tips/hide-file-in-picture/, Apr. 16, 2008.

* cited by examiner

CONTENT-BASED AUTOMATIC BACKUP OF IMAGES

TECHNICAL FIELD

This disclosure pertains generally to computer backup and to computer security, and more specifically to content-based automatic backup of images.

BACKGROUND

Backup solutions automatically backup files from the computers of users and organizations to the cloud, according to a backup configuration. An endpoint component of a backup system runs on a user's computer, and performs the client side backup functionality. The backed-up files are maintained in the cloud by a backend component of the backup system, and are available to be restored in case of data loss.

For each covered endpoint, a backup configuration specifies the specific set of folders/directories, files, file types, etc. to backup, as well as other criteria such as backup time and frequency. Contemporary backup systems typically provide a default backup configuration, which many users do not change. Users may also manually configure a set of folders/directories, files, etc. to back up.

Whether the default backup set is utilized or one configured by the user, all files within the specified folders/directories will be backed up, regardless of whether the given files are important to the user or not. In addition, application and user level changes occur over time that can result in the backup set omitting files that are especially important to the user. For example, the user could accidently copy photos and videos to folders outside of the backup set, or a new disk or other storage medium could be added to the user's computer, such as an external storage device. None of the photos or videos stored on the user's computer in any location outside of what is specified by the backup set will be backed-up. As users frequently neglect or forgot to update their backup sets, this can result in the user losing important files if the disk is corrupted or crypto-locked.

It would be desirable to address these issues.

SUMMARY

The content of each specific image file on an endpoint is analyzed. Each analyzed image file is categorized based on the results of analyzing its content. The analysis can be in the form identifying one or more objects graphically represented in given image files, and the categorization of image files can be based on these identified graphically represented object(s). For example, graphical representation(s) of person(s) can be identified, either generally or at the level of specific individuals. In one embodiment, automatic computerized facial recognition is utilized to identify a specific person depicted by an identified graphical representation in an image file. Other examples of objects that can be identified in image file content are graphical representations of specific places (e.g., Yellowstone National Park, New York City) or types of places (e.g., beaches, forests) specific events (e.g., a specific graduation or wedding) or types of events (e.g., baseball games, concerts), specific animals (e.g., a specific pet dog or cat) or types of animals (e.g., cats, chickens, horses), and specific inanimate objects (e.g., a specific car or bicycle) or types of inanimate objects (e.g., airplanes, houses). Another example of an object that can be identified in the content of an image file is the graphical representation of text. The categorization of image files based on objects identified in their content can be at any level of granularity, and can be based on individual identified objects or combinations thereof. The categorization can be supplemented by additional factors such as the location at which an image file was created (e.g., GPS coordinates at which a digital photo was taken), the identifier of the device on which the image file was created (e.g., the id of the phone or digital camera), and/or the source of the image file external to the endpoint (e.g., the Internet, a USB stick). Categorization metadata concerning each specific one of the image files in the file set is maintained. The categorization metadata concerning a specific image file describes its categorization based on the results of analyzing its content.

A backup policy is configured to automatically backup specific image files on the endpoint, based on their content as per the categorization. Information concerning the content-based categorization of the image files on the endpoint can be output to a user, for example through a GUI or other types of user interface. This output information can, for example, describe specific objects and/or types of objects that have been identified in image files on the endpoint. In response to outputting the information concerning content-based categorization of the image files on the endpoint, one or more directives for backing-up image files according to their content-based categorization can be received from the user. These directive can specify to back-up image files containing specific objects, types of objects, and combinations thereof. Specific images files are then backed-up automatically, regardless of their location on the endpoint, according to the configured backup policy.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
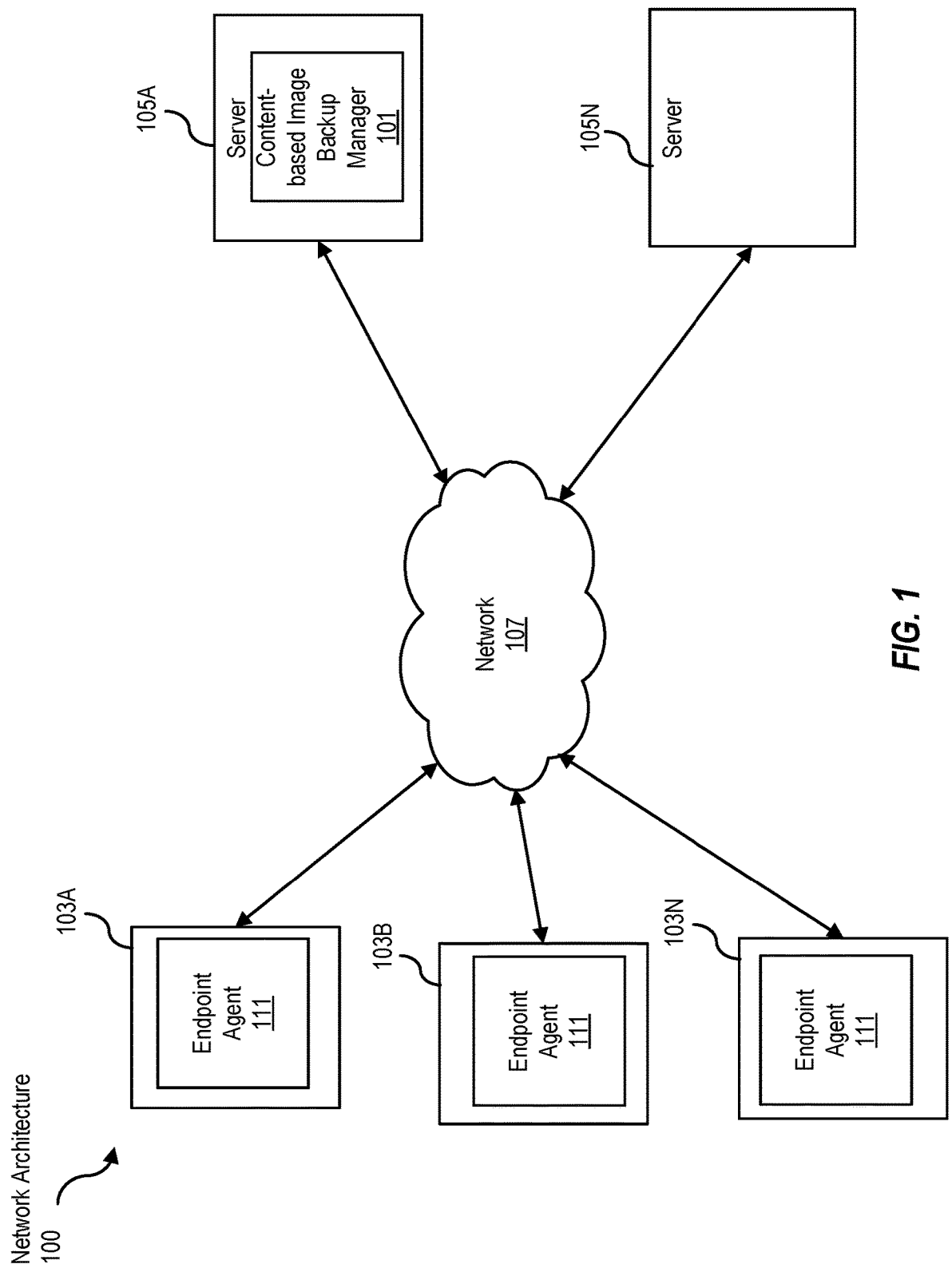
FIG. 1 is a block diagram of an exemplary network architecture in which a content-based image backup manager can be implemented, according to some embodiments.

FIG. 1 is a block diagram illustrating an exemplary network architecture 100 in which a content-based image backup manager 101 can be implemented. The illustrated network architecture 100 comprises multiple clients 103A, 103B and 103N, as well as multiple servers 105A and 105N. In FIG. 1, a content-based image backup manager 101 is illustrated as residing on server 105A, with an endpoint agent 111 residing on each client 103A-C. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications (e.g., smartphones, tablet computers, wearable computing devices, etc.).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
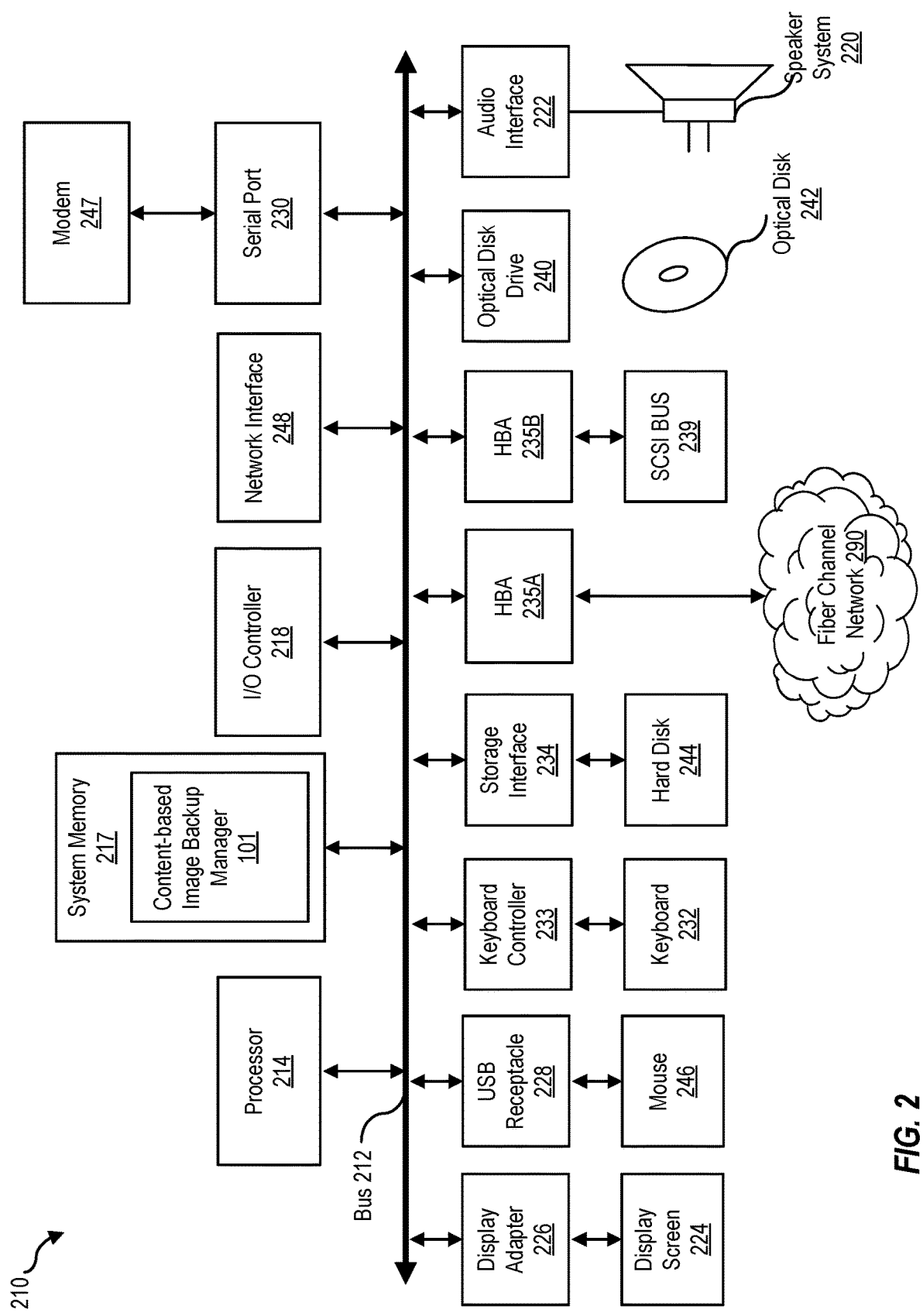
FIG. 2 is a block diagram of a computer system suitable for implementing a content-based image backup manager, according to some embodiments.

FIG. 2 is a block diagram of a computer system 210 suitable for implementing a content-based image backup manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the content-based image backup manager 101 is illustrated as residing in system memory 217. The workings of the content-based image backup manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
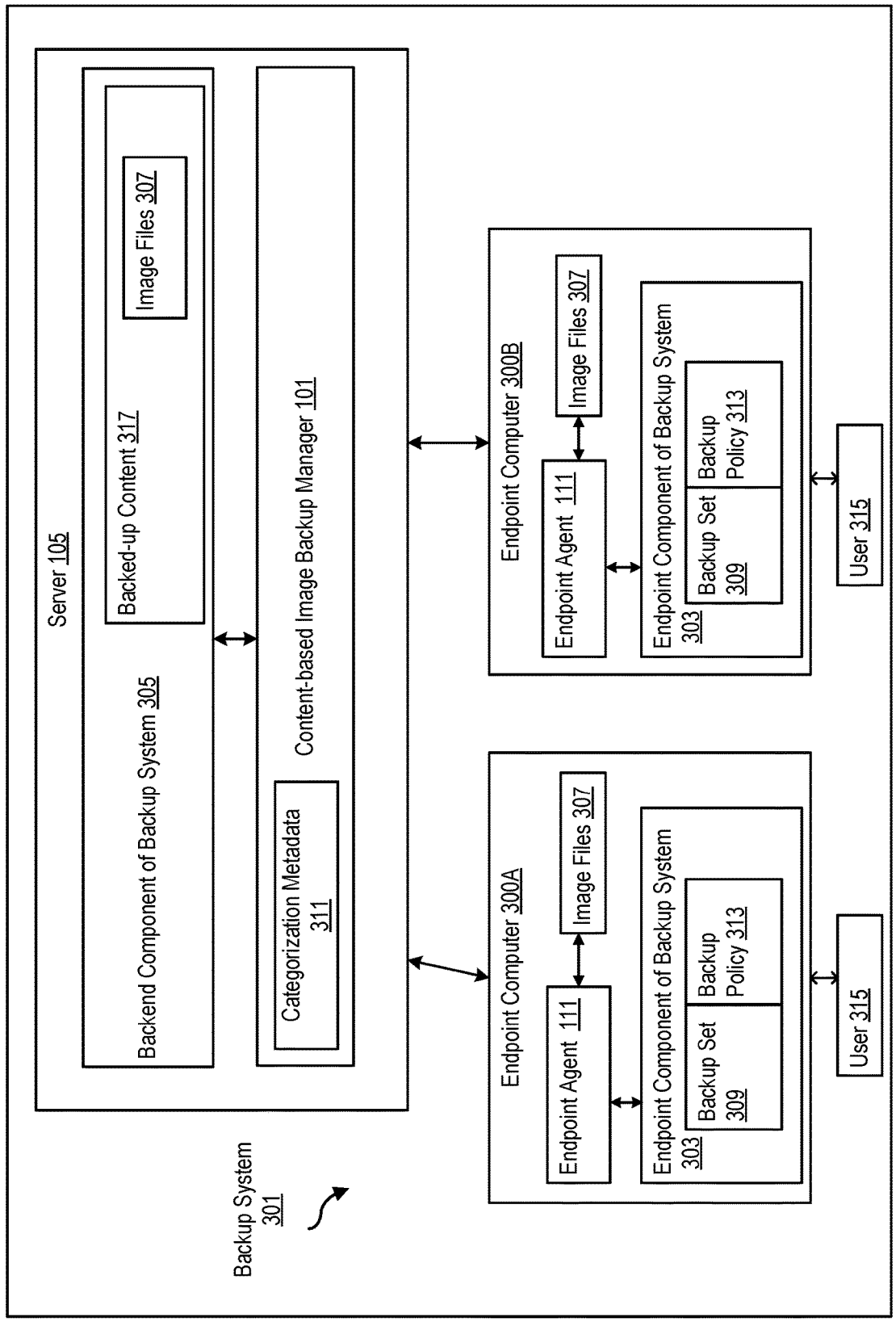
FIG. 3 is a high level block diagram of the operation of a content-based image backup manager, according to some embodiments.

FIG. 3 illustrates the operation of a content-based image backup manager 101 running on a server 105 and communicating through a network 107 (e.g., the Internet) with multiple endpoint agents 111. As described above, the functionalities of the content-based image backup manager 101 can reside on specific computers 210 or be otherwise distributed between multiple computer systems 210, including between one or more server(s) 105 and a plurality of clients 103, and including within a fabric/cloud-based computing environment in which the functionality of the content-based image backup manager 101 is provided as a service over a network 107.

As illustrated in FIG. 3, the content-based image backup manager 101 runs in conjunction with a backend (e.g., server side, cloud based) component 305 of a backup system 301, whereas the endpoint agents 111 run in conjunction with endpoint (e.g., client side) components 303 of a backup system 301. In FIG. 3, the content-based image backup manager 101 and endpoint agents 111 are depicted as separate entities that are communicatively coupled with the backend component 305 and endpoint component 303 of the backup system 301. It is to be understood that in some embodiments, the content-based image backup manager 101 and/or endpoint agents 111 can be instantiated as components of the backup system 301. The backend component 305 of the backup system 301 and the content-based image backup manager 101 are illustrated as residing on the same server 105, although the functionalities associated with one or both of these components can be distributed across multiple computers 210 at a single or multiple locations as desired.

The centralized backend component 305 of the backup system 301 communicates with endpoint computers 300 on which the endpoint level components 303 of the backup system 301 are installed. These endpoints 300 are the computer systems 210 of the customers of the backup system 301 vendor. Although FIG. 3 only depicts two endpoint computers 300A and 300B for clarity of illustration, it is to be understood that in practice the centralized backend component 305 of the backup system 301 can communicate with orders of magnitude more endpoints 300 (e.g., dozens, hundreds, thousands, tens of thousands, etc.), depending on the size of the installed customer base.

The content-based image backup manager 101 enables automatic backup of image files 307 regardless of their storage location on a given endpoint 300, based on content analysis. As illustrated in FIG. 3, the content-based image backup manager 101 analyzes the image files 307 on an endpoint (e.g., endpoint 300A), and categorizes each image file 307 according to its content, regardless of where on the endpoint 300 the image file 307 is stored (e.g., in what folder), and whether or not the image file 307 is in the backup set 309.

As used herein, the term "backup set 309" refers to a set of files, folders and/or other resources designated for backup on a specific endpoint 300. The files in a backup set 309 can be, for example, automatically backed-up according to a schedule (e.g., daily. weekly, monthly, etc.).

As used herein, the term "image file 307" refers to a stored digital image or representation of graphical information, in a format that can be rasterized for display on a screen, printer or similar output device. Once rasterized, the image becomes a grid of pixels. An image file 307 may be stored in any uncompressed, compressed or vector format. Examples of image file formats are JPEG, Exif, TIFF, GIF, BMP, PNG, PSD, CGM, SVG, etc. In some embodiments, the content-based image backup manager 101 also analyzes the video content in digital video files, and categorizes the video files based on the analysis of this content. Thus, it is to be understood that as used herein the term "image file 307" also encompasses files containing digital video in formats such as MPEG, WebM, Windows Media Video, Ogg Video, etc. A video file typically contains coded video data in a given format, as well as audio data and additional metadata.

The content-based categorization of image files 307 is described in detail below in conjunction with FIGS. 4 and 5, and can be at any desired level of granularity. For example, specific image files 307 can be categorized as containing imagery of people, places, things, events, animals, etc. The content-based categorization of image files 307 can also be supplemented with additional information describing the image files 307, such as identifiers of devices used to create image files 307, sources from which image files 307 were obtained, GPS coordinates of locations at which photographs were taken, etc. The categorization information concerning the image files 307 on each endpoint 300 is stored as metadata 311. This categorization metadata 311 can be stored on the backend as illustrated in FIG. 3, and/or on the given endpoint 300.

Once the image files 307 on a given endpoint 300 have been analyzed and categorized according to content, the content-based image backup manager 101 facilities automatic identification and backup of those image files 307 that are most important to the user 315, regardless of their location on the endpoint 300 or their inclusion in/exclusion from the default or conventional backup set 309. In some embodiments, the content-based image backup manager 101 enables users 315 to specify content-based priorities for backup of image files 307 at any level of granularity. These features are described in detail below in conjunction with FIGS. 4 and 5.

Figure 4:
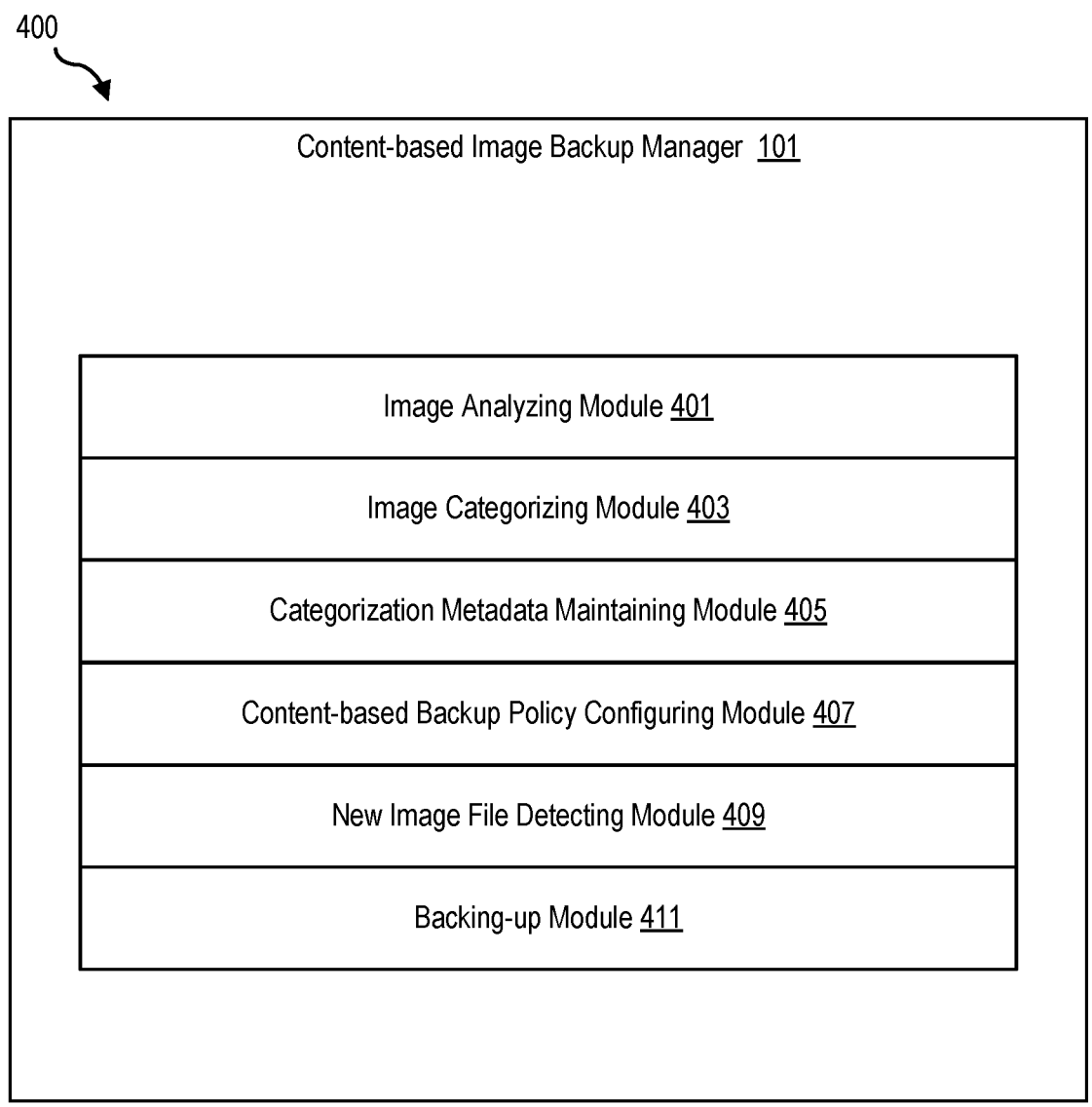
FIG. 4 is a block diagram of a content-based image backup manager, according to some embodiments.

FIG. 4 illustrates a specific multiple module instantiation of a content-based image backup manager 101, according to one embodiment. It is to be understood that although the content-based image backup manager 101 is illustrated as a single entity, the illustrated content-based image backup manager 101 represents a collection of functionalities, which can be instantiated as a single or multiple modules as desired. It is to be understood that the modules of the content-based image backup manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the content-based image backup manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 5:
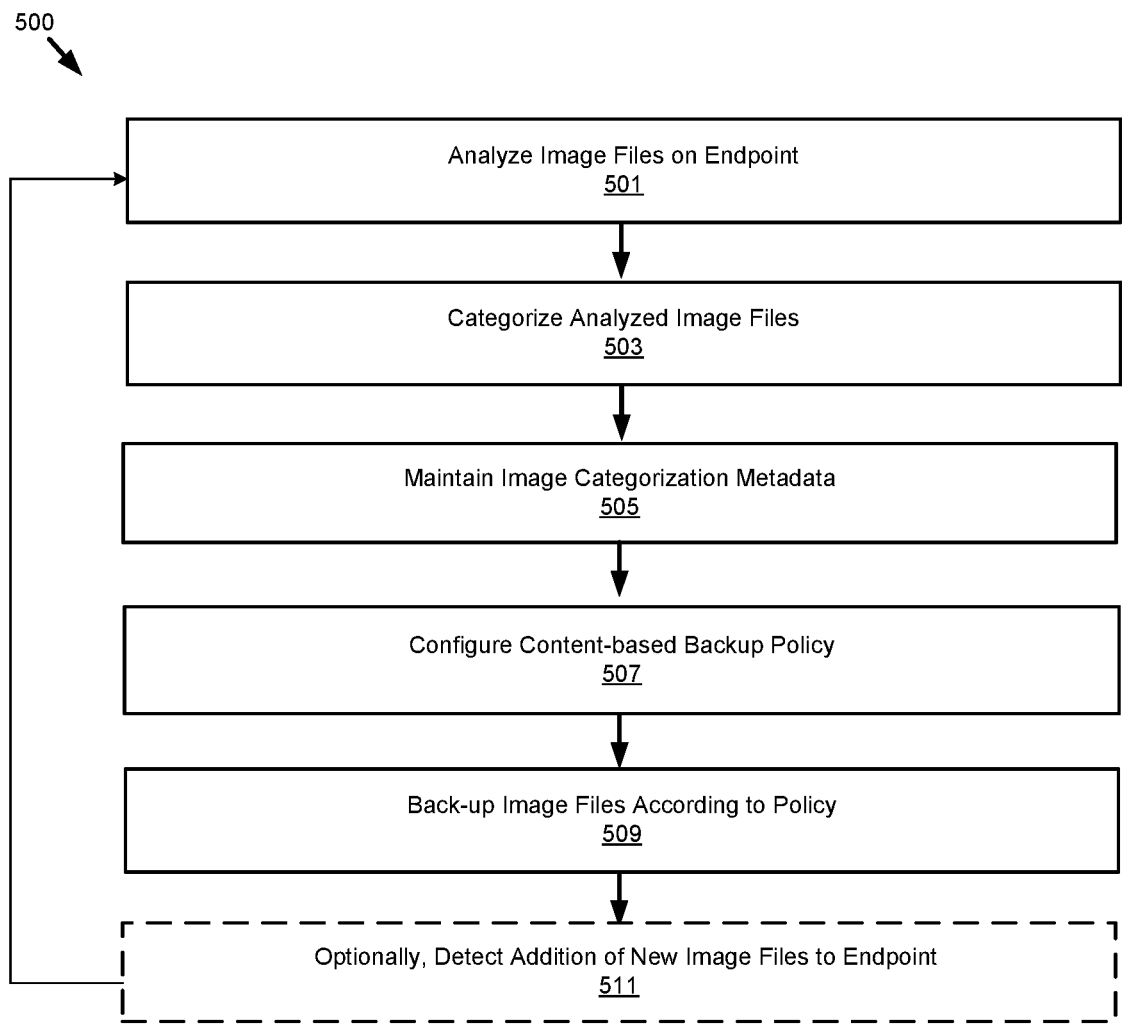
FIG. 5 is a flowchart illustrating steps performed by a content-based image backup manager, according to some embodiments.

FIG. 5 illustrates steps 500 executed by the content-based image backup manager 101, according to some embodiments. For clarity of description, the subject matter illustrated in FIGS. 4 and 5 is described together below.

The image analyzing module 401 of the content-based image backup manager 101 analyzes 501 all of the image files 307 on the endpoint 300, including any image files 307 residing in folders/directories not identified by the backup set 309. The analysis of image files 307 can take the form of identifying specific objects represented in the content of image files 307. The identified objects are used to categorize the corresponding image file 307, as described in more detail below. Different objects and types of objects in the image files 307 are identified in different embodiments. For example, in one embodiment graphical representations of people are identified, e.g., by using facial recognition. Facial recognition algorithms and techniques are known to those of ordinary skill in the relevant art, and the implementation mechanics of their use within the context of the content-based image backup manager 101 will be readily apparent to those of such a skill level in light of this specification. In one embodiment, once a given image is determined to contain one or more people, the individuals can be identified more specifically, for example by gleaning the information from the user's social network(s) or an external database of known faces, or by prompting the users 315 to identify people in specific images, etc. In another embodiment, image files 307 are identified as containing people generically but no attempt is made to identify specific individuals.

Identifying image files 307 containing people as well as further identifying specific people in the images are just examples for the type of information concerning image file content that the image analyzing module 401 can determine. In some embodiments the image analyzing module 401 can identify graphical representations of specific places in image files 307, such as specific national parks, landmarks, tourist destinations, museums, etc., for example using public or proprietary image databases. Specific types of scenery (e.g., beaches, mountains, cliffs, cities, rivers, etc.) can also be identified. Another example is specific events or types of events, such as sporting events, concerts, graduations, weddings, etc. Various specific instances or types of domestic, farm and wild animals can be identified in image files 307, as can different inanimate objects such as cars, vans, trucks, airplanes, boats, houses, street signs, etc. Another example of an object that can be identified in the content of an image file 307 is the graphical representation of text. It is to be understood that these are just non-exhaustive examples of objects (and types of objects) that can be identified in image files 307.

An image categorizing module 403 of the content-based image backup manager 101 categorizes 503 each analyzed image file 307 on the endpoint 300, based on the above-described analysis. In other words, the image files 307 can be categorized based on their content as determined via the analysis. This categorization can be at any level of granularity as desired (e.g., a specific image file 307 can be categorized as containing images of people generally, a specific number of people, specific people, a given type of event, a specific event, etc.). Each image file 307 can be categorized according to multiple separate categories depending upon the various objects and such identified in the given embodiment (e.g., a specific image file 307 can be categorized as containing images of a specific person, at a specific national park, as well as redwood trees, a bear, an RV, etc.).

In some embodiments, the above-described object recognition based categorization can be supplemented by additional information concerning image files 307 gleaned during the analysis, such as location (e.g., GPS coordinate) of where a photograph was taken, an identifier of the device with which it was taken (e.g., specific make and/or model of digital camera/phone), the source of the image file (e.g., was it downloaded from Internet or copied from an SD card?), etc. Further categorizing image files 307 according to such additional information refines the level of precision of the categorization.

A categorization metadata maintaining module 405 of the content-based image backup manager 101 maintains 505 image categorization metadata 311 concerning the image files 307 on the endpoint 300. More specifically, as image files 307 are analyzed and categorized based on content and other factors as described above, the resulting information describing the categorization of the various image files 307 is stored and maintained as categorization metadata 311. The categorization metadata 311 concerning the image files 307 can be stored on the backend, e.g., with the corresponding backups, or on the endpoint, 300 as desired. Note that although FIG. 3 illustrates the categorization metadata 311 being maintained on the same server 105 as the backend component 305 backup system 301, this is just an example, and the categorization metadata 311 can be maintained on the endpoint 300 or anywhere in the cloud as desired.

Once the image files 307 on the endpoint 300 have been analyzed and categorized, a content-based backup policy configuring module 407 of the content-based image backup manager 101 configures 507 a backup policy 313 to automatically back-up specific image files 307 that are important to the user 315 based on their categorized content, regardless of their location on the endpoint 300. More specifically, the content-based backup policy configuring module 407 can use the categorization metadata 311 concerning the categorized image files 307 on the endpoint 300 to present the user 315 with information concerning the content-based categorization of the image files 307, such as which types of objects (people, places, things) and which specific objects have been identified therein. Such output of information to the user 315 can be through a user interface (e.g., a GUI). It is to be understood that the format in which information concerning the content-based categorization of the image files 307 is output to the user 315 is a variable design parameter. For example, such information can be displayed graphically and/or textually through the interface, for example by displaying labeled images of specific identified content objects or types of content objects, by displaying a collection of labeled GUI components corresponding to classified content objects, or by displaying a labeled chart, graph, list etc. The level of granularity at which to provide information concerning the content-based categorization of the image files 307 to the user 315 is also a variable design parameter.

Based on the information concerning the content-based categorization of the image files 307 as presented to the user 315, the user 315 can specify directives for backing-up image files 307 based on their content as categorized, e.g., through the user interface. These user 315 specified backup directives can be at any level of granularity. For example, backup directives can be based on identified people in the image files 307, such as a directive to automatically backup all photos and/or videos with specific recognized people in them, such as a spouse, children, other family members, etc. Backup directives can also be based on events, such as automatic backup of all image files 307 documenting special occasions, such as weddings, sporting events, concerts, and/or circuses, etc. (either in general or more specially, e.g., Bill and Anne's wedding, Susan's graduation, the super bowl, etc.). Backup directives can also be based on place, such as a directive to automatically backup all photos taken in any national park (identified by signage, landmarks, location confirmed by GPS tags, etc.). As noted above, backup directives can be at any level of granularity, and can combine categories, such as, for example, automatically backup all image files 307 of the user's vacation in Hawaii with his/her son, (identified, for example, based on the presence of the user's son, plus sea and/or sand, etc.).

Backup preference directives can not only specify categorized content based on which to execute backup activity, but can also provide additional instructions concerning associated backup activity, such as to store extra copies of all backed-up images of the user's son, to prompt the user 315 for a decision before backing-up images of unrecognized people taken with a specific camera (e.g., the user's phone camera), and to back-up images of the user's family with a higher priority than all other images, for example.

It is to be understood that the format in which the user 315 provides backup preference directives is a variable design parameter. For example, such information can be entered based on selecting displayed graphical objects, operating labeled GUI components and/or entering text through an interface. The level of granularity at which the user 315 provides backup preference directives based on information concerning the content-based categorization of the image files 307 is also a variable design parameter.

In some embodiments, the content-based backup policy configuring module 407 configures 507 the backup policy 313 to account for the received user 315 provided backup directives by modifying the backup set 309 accordingly. In other words, the content-based backup policy configuring module 407 can modify the backup set 309 to specify the target image files 309 be backed-up, according to the specific terms and conditions of the directives, thereby modifying the backup set 309 to account for the configured backup policy 313 taking into account the user 315 provided backup directives. In other embodiments, the content-based backup policy configuring module 407 configures the backup policy 313 such that the received directives are carried out in addition to the conventional backup set 309.

A backing-up module 411 of the content-based image backup manager 101 proceeds to back-up 509 the image files 307 specified by the backup policy 313, which has been configured to account for the user 315 provided backup directives. As a result, the image files 307 targeted by the directives, which are those of greatest importance to the user 315, are backed-up, regardless of where these image files 307 are stored on the endpoint, and whether or not they are included in the conventional backup set 309.

A new image file detecting module 409 of the content-based image backup manager 101 detects 511 the addition of new image files 307 to the endpoint 300. This can the form of scanning a disk or other storage medium that is added to the endpoint 300, and identifying image files 307 thereon, or the identification of new image files 307 downloaded from the internet, copied from other devices, etc. In any case, when new images files 307 are detected on the endpoint, the new image files are analyzed and classified as desired above.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method comprising:
    analyzing, by a computing device, content of each specific one of a plurality of image files on an endpoint;
    for each specific image file of the plurality of image files, categorizing, by the computing device, the specific image file, based on results of analyzing its content;
    maintaining, by the computing device, categorization metadata concerning each specific one of the plurality of image files, wherein categorization metadata concerning a specific image file describes its categorization based on results of analyzing its content;
    configuring, by the computing device, a backup policy to automatically backup specific image files of the plurality of image files on the endpoint, based on the categorization of the specific image files based on the results of analyzing their content; and
    automatically backing-up the specific images files of the plurality, by the computing device, regardless of their location on the endpoint, according to the configured backup policy.

2. The method of claim 1 further wherein:
    analyzing content of an image file further comprises identifying at least one object graphically represented therein; and
    categorizing an image file is further based on the at least one identified graphically represented object.

3. The method of claim 1 further wherein:
    analyzing content of an image file further comprises identifying multiple graphically represented objects therein; and
    categorizing an image file is further based on a combination of identified graphically represented objects.

4. The method of claim 1 wherein:
    analyzing content of an image file further comprises identifying at least one graphical representation of a person.

5. The method of claim 4 wherein identifying at least one graphical representation of a person further comprises:
    utilizing, by the computing device, automatic computerized facial recognition to identify a specific person depicted by an identified graphical representation in an image file.

6. The method of claim 4 wherein identifying at least one graphical representation of a person further comprises:
    prompting, by the computing device, a user to input an identification of a specific person depicted by an identified graphical representation in an image file.

7. The method of claim 1 wherein:
    analyzing content of an image file further comprises identifying at least one graphical representation of a specific place or of a type of place.

8. The method of claim 1 wherein:
    analyzing content of an image file further comprises identifying at least one graphical representation of a specific event or of a type of event.

9. The method of claim 1 wherein:
    analyzing content of an image file further comprises identifying at least one graphical representation of a specific animal or of a type of animal.

10. The method of claim 1 wherein:
    analyzing content of an image file further comprises identifying at least one graphical representation of a specific inanimate object or of a type of inanimate object.

11. The method of claim 1 wherein:
    analyzing content of an image file further comprises identifying a graphical representation of text.

12. The method of claim 1 wherein:
    categorizing an image file is further based on at least one factor from a group of factors consisting of: a location of image file creation, an identifier of a device on which an image file was created and a source of an image file external to the endpoint.

13. The method of claim 1 wherein configuring a backup policy to automatically backup specific image files of the plurality further comprises:
    outputting, by the computing device to a user, information concerning content-based categorization of the image files on the endpoint;
    in response to outputting the information concerning content-based categorization of the image files on the endpoint, receiving, by the computing device from the user, at least one directive for backing-up image files according to their content-based categorization.

14. The method of claim 13 wherein outputting information concerning content-based categorization of the image files on the endpoint further comprises:
    outputting information concerning specific types of objects that have been identified in image files on the endpoint, based on the categorization metadata.

15. The method of claim 13 wherein outputting information concerning content-based categorization of the image files on the endpoint further comprises:

outputting information concerning specific objects that have been identified in image files on the endpoint, based on the categorization metadata.

16. The method of claim 13 receiving at least one directive for backing-up image files according to their content-based categorization further comprises:

receiving a directive to back-up image files containing at least one specific type of object.

17. The method of claim 13 receiving at least one directive for backing-up image files according to their content-based categorization further comprises:

receiving a directive to back-up image files containing at least one specific object.

18. The method of claim 13 receiving at least one directive for backing-up image files according to their content-based categorization further comprises:

receiving a directive to back-up image files containing at least one specific combination of objects and/or object types.

19. At least one non-transitory computer readable-storage medium storing computer executable instructions that, when loaded into computer memory and executed by at least one processor of a computing device, cause the computing device to execute the following steps:

analyzing, by a computing device, content of each specific one of a plurality of image files on an endpoint;

for each specific image file of the plurality of image files, categorizing, by the computing device, the specific image file, based on results of analyzing its content;

maintaining, by the computing device, categorization metadata concerning each specific one of the plurality of image files, wherein categorization metadata concerning a specific image file describes its categorization based on results of analyzing its content;

configuring, by the computing device, a backup policy to automatically backup specific image files of the plurality of image files on the endpoint, based on the categorization of the specific image files based on the results of analyzing their content; and automatically backing-up the specific images files of the plurality, by the computing device, regardless of their location on the endpoint, according to the configured backup policy.

20. A computer system comprising:

system memory;

an image analyzing module residing in the system memory, the image analyzing module being programmed to analyze content of each specific one of a plurality of image files in a set of files on an endpoint;

an image categorizing module residing in the system memory, the image categorizing module being programmed to, for each specific image file of the plurality of image files in the file set, categorize the specific image file, based on results of analyzing its content;

a categorization metadata maintaining module residing in the system memory, the categorization metadata maintaining module being programmed to maintain categorization metadata concerning each specific one of the plurality of image files in the file set, wherein categorization metadata concerning a specific image file describes its categorization based on results of analyzing its content;

a content-based backup policy configuring module residing in the system memory, the content-based backup policy configuring module being programmed to configure a backup policy to automatically backup specific image files of the plurality of image files on the endpoint, based on the categorization of the specific image files based on the results of analyzing their content;

a backing-up module residing in the system memory, the backing-up module being programmed to back-up the specific images files of the plurality automatically, regardless of their location on the endpoint, according to the configured backup policy; and at least one processor configured to execute the modules.

* * * * *